United States Patent [19]

Yoneda et al.

[11] Patent Number: 4,827,352
[45] Date of Patent: May 2, 1989

[54] METHOD OF AND APPARATUS FOR CHANGING THE PIXEL DENSITY OF A BINARY IMAGE USING AVERAGE VALUES CALCULATED FROM SETS OF REFERENCE PIXELS SELECTED FROM THE BINARY IMAGE

[75] Inventors: Hitoshi Yoneda, Kawasaki; Tadanobu Kamiyama, Yokosuka, both of Japan

[73] Assignee: Kabushiki Kaisha Toshiba, Kawasaki, Japan

[21] Appl. No.: 26,572

[22] Filed: Mar. 17, 1987

[30] Foreign Application Priority Data

Mar. 17, 1986 [JP] Japan ................................. 61-58640

[51] Int. Cl.⁴ ........................ H04N 1/393; H04N 1/40
[52] U.S. Cl. ................................. 358/287; 358/280; 358/283; 358/298
[58] Field of Search ............... 358/280, 283, 287, 298

[56] References Cited

U.S. PATENT DOCUMENTS

| 4,150,401 | 4/1979 | Yamamoto et al. | 358/287 |
| 4,194,221 | 3/1980 | Stoffel | 358/283 |
| 4,381,547 | 4/1983 | Ejiri | 358/280 |
| 4,484,347 | 11/1984 | Kashioka | 358/287 |
| 4,515,462 | 5/1985 | Yoneda | 355/4 |
| 4,630,125 | 12/1986 | Roetling | 358/280 |
| 4,698,778 | 10/1987 | Ito et al. | 358/287 |
| 4,701,808 | 10/1987 | Nagashima | 358/287 |

FOREIGN PATENT DOCUMENTS

| 56-40363 | 4/1981 | Japan | 358/280 |
| 56-51158 | 5/1981 | Japan | 358/280 |
| 58-59666 | 4/1983 | Japan | 358/287 |

OTHER PUBLICATIONS

Dashiell, Stephen R., "Digital Halftone Screener and Rescreener", *Xerox Disclosure Journal*, vol. 5, No. 1, Jan./Feb. 1980, p. 117.

Shojima, Hiroshi et al., "Evaluation of Some Binary Image Enlargement and Shrink Methods and Speed-Up Method", Transactions of Information Processing Society of Japan, vol. 26, No. 5, pp. 920–925, (Sep. 1985).

IEEE, IEDM 81, pp. 313–316, 1981, "A Contact-Type Linear Sensor with a GD a-Si:H Photodetector Array", Y. Kanoh et al.

IEEE, IEDM 81, pp. 309–312, 1981, "A 2048-Element Contact Type Linear Image Sensor for Facsimile", Kazumi Komiya et al.

IECE (Japan), IE80-72, pp. 73–82, 1980, "A4 Size Contact Type Image Sensor", Kazumi Komiya et al.

*Primary Examiner*—James J. Groody
*Assistant Examiner*—Randall S. Svihla
*Attorney, Agent, or Firm*—Oblon, Fisher, Spivak, McClelland & Maier

[57] ABSTRACT

An image processing apparatus includes a dither processor, which converts an electrical signal representing a continuous-tone input image into a binary image singal by a dither method using a dither matrix. The binary image signal is stored in a memory, and supplied to a pixel-density conversion processor, which converts a pixel density of the binary image signal at a predetermined ratio, and generates a converted image with the pixel coordinates as defined by the conversion ratio. A pixel coordinate calculator calculates a coordinate position of each pixel of the converted image in the binary image, and selects a fiducial pixel. A reference pixel selector defines a window area on the binary image containing the fiducial pixel and corresponding in size to the dither matrix size, and extracts reference picture elements in the window area. A calculator calculates an average image-density of the reference picture elements and generates density data, which is binarized by a second dither processor by using a second dither matrix.

14 Claims, 5 Drawing Sheets

METHOD OF AND APPARATUS FOR CHANGING THE PIXEL DENSITY OF A BINARY IMAGE USING AVERAGE VALUES CALCULATED FROM SETS OF REFERENCE PIXELS SELECTED FROM THE BINARY IMAGE

BACKGROUND OF THE INVENTION

The present invention relates to an image processing technique, and more particularly to a method and apparatus for applying the pixel-density conversion to a continuous-tone image binarized by the dither method.

The pixel-density conversion process of an original image has been used in various types of image processings. A typical application of this process is the pixel-density conversion of the image in transferring the image data between different types of facsimiles with different scanning line densities. Another application of the process is found in the computer-assisted office equipment such as a work station for generating documents containing continuous-tone images such as photographs, in addition to characters and figures. In such equipment, the pixel-density conversion process is used for changing (enlargement or reduction) the size of the continuous-tone image.

The pixel-density conversion methods for the original image, which have widely been used, are the SPC (selective processing conversion) method, the logical summing method, and the projecting method. These kinds of methods are effective when they are applied for the binary image having picture elements (pixels) with only one of two-levels, i.e., "white" and "black", such as the images of the document containing only characters, for example. These methods, however, are ineffective for the enlargement/reduction of continuous-tone images such as photographs. Specifically, if those methods are applied for changing the size of such images, the half-tone, or "gray" level of the "white" and "black" image can inappropriately be depicted on the screen. The image tone characteristic of the converted image is degraded, resulting in great deterioration of the picture quality of the converted image.

In this field of technique, there has been known the use of the dither method for the purpose of converting a pixel density in the continuous-tone image. The dither method may be defined as a technique for representing the entire gray scale of a picture image, in which a multilevel input image signal is compared with a position-dependent set of thresholds, and pixels are set to "white" only where the image input signal exceeds the threshold. If the dither method is used, the pixel-density conversion for the continuous-tone image, such as a photograph image of the facsimile communication, whose commercial market is expanding year by year, or photographs contained in the office document, can be performed, while keeping a good picture quality, which is superior to that produced by the prior pixel-density conversion method.

At present, however, the picture quality of the image converted by the dither method (this image will be referred to as a "converted image") is still unsatisfactory. In the prior pixel-density conversion by the dither method, a multilevel input image is subjected to the primary dither process, to generate a binarized, or two-level original image signal. If this image is simply reduced at a selected conversion ratio by using an appropriate known method, such as the SPC method, the coarsened and irregular image areas in tone, and a Moire pattern appear in the reproduced image. The result is an unsatisfactory tone characteristic of the reproduced image. The prior technique was almost unable to solve this problem. This fact provided a serious problem in the image processing system handling the continuous-tone images.

SUMMARY OF THE INVENTION

It is therefore an object of the present invention to provide a new and improved method and apparatus which can perform the pixel density conversion while keeping a good continuous-tone characteristic of the initial image and minimizing the generation of the Moire pattern.

In accordance with the above object, the present invention is addressed to a specific image processing apparatus with a dither processor. An electrical binary signal representing a continuous-tone input image is converted by a dither method which is based on a first dither matrix with a matrix pattern of multi-level threshold values and with a predetermined matrix size. The binary image signal is supplied to a pixel-density conversion processor. The conversion processor converts a pixel density of the binary, or two-level image signal at a predetermined conversion ratio, and generates a signal representing a converted image with the pixel coordinates as defined by the conversion ratio.

The pixel-density conversion processor includes a pixel coordinate calculator. The calculator calculates a coordinates position of each in the converted image pixel in the binary image, which is compared with each pixel of the converted image. A certain pixel is then selected from among the pixels of the binary image, which serves to define a fiducial point. A reference pixel selector is provided, which defines a window area on the binary image. The window area contains the certain pixel and corresponds in size to the first dither matrix size. The reference pixel selector extracts several pixels of the binary image, which are contained in the window area and located around the certain pixel. The extracted pixels are treated as the reference picture elements. An average image-density calculator calculates an average density of the reference picture elements, and generates the density data locally averaged, which is binarized by using a second dither matrix.

BRIEF DESCRIPTION OF THE DRAWINGS

The present invention and its objects and advantages will be clearer when reading the detailed description presented below in connection with the accompanying drawings, in which.

DETAILED DESCRIPTION OF THE PREFERRED EMBODIMENTS

Figure 1:
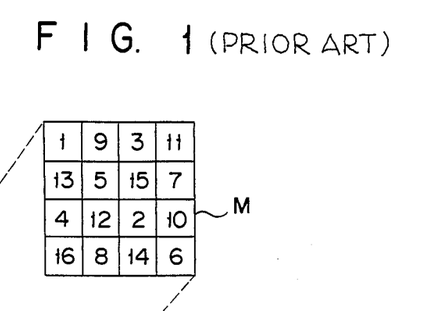
FIG. 1 is a diagram showing a matrix pattern of a dither matrix having a number of threshold levels used in a dither method of image representation.

A conventional technique for converting a pixel density of a continuous-tone image, which is based on the dither method, will be described in more detail referring to FIGS. 1 and 2. FIG. 1 shows a model of a dither matrix M used for converting a pixel density of a binary image. Dither matrix M is a square matrix of threshold values that is repeated as a regular array to provide a threshold pattern for an entire image in the dither method of image representation. In the example of FIG. 1, dither matrix M has a 4×4 matrix size, which provides 16 different threshold values as denoted simply by numerals.

Figure 2:
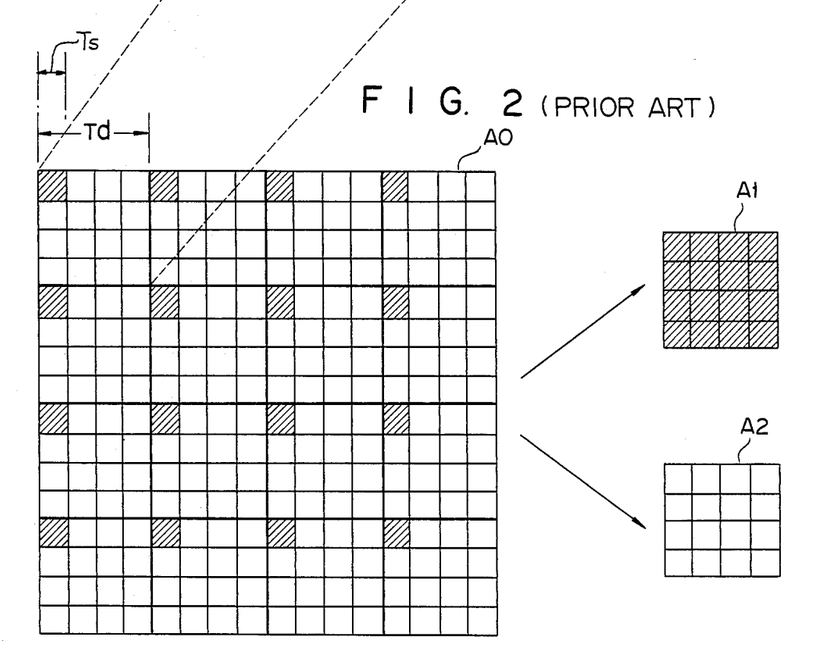
FIG. 2 is a diagram showing a model of pixel pattern of a binarized image which is subjected to a pixel-density conversion process using the dither matrix shown in FIG. 1, the diagram also showing examples of output images which are produced using a conventional pixel-density conversion.

If an original image whose density levels are "1" (light gray) over the entire image area, is binarized using the dither method, a binary image A0 is obtained as shown in FIG. 2. Image A0 is divided into unit areas each with a size corresponding to that of dither matrix M. In each unit area, only one picture element, or pixel, which is hatched in FIG. 2 and located at the left uppermost position in the unit area, has the density level "1" (black), because this pixel coincides with the threshold value "1" of dither matrix M. The remaining pixels have all the density level "0" (white).

When two-level image A0 is subjected to a pixel-density conversion process, for example, for quartering the image, by using the known SPC method, if the sampling start position casually coincides with the pixel (black pixel) at the density level "1", the reduced image (converted image) as pixel-density conversion processed becomes an image which is black over its entire area, as indicated by A1 in FIG. 2, that is, it has the image density level of "16". If the sampling start position is not coincident with the pixel at the density level "1", the converted image becomes an image which is entirely white, as indicated by A2 in FIG. 2, that is, it has the image density level of "0". Thus, the converted image is inevitably set to either of the types of images at "16" and "0" in image density level. As a result, a pseudo-contour is undesirably generated in the converted image, resulting in deterioration of the continuous-tone characteristic of the image. This brings about degradation of the picture quality. Such tone characteristic deterioration problem is more complicated for the different threshold patterns of the dither matrix and/or the different conversion ratios in the pixel-density conversion.

A second problem of picture quality degradation is the Moire phenomenon generated in the converted image. "Moire" means an interference pattern which is generated when two or more, light and shade patterns at different periods overlap one another. The Moire appears in an actual image, as a stripe pattern. The dithered binary image A0 has the period dependent on the size of the dither matrix M. In the example of FIG. 2, the period Td of the dither pattern is substantially equal to the array length of the four pixels array. In the pixeldensity conversion process, a sampling period exists which is dependent on the conversion ratio. Assuming that the number of pixels of an original image is 1×1, the number of pixels of the shrunken image (converted image) is m×m. "l" and "m" are natural numbers having no divisor and l>m, conversion ratio Cv is mathematically expressed $$Cv = m/l \qquad (1)$$

As seen from this, in the pixel-density conversion process, the sampling period Ts exists equal to the length of the pixels of l. The sampling period Ts interferes with the period Td of the dither pattern, so that an undesired Moire pattern appears on the image. The period Tm of the Moire is given $$Tm = Cv \times L \qquad (2)$$

where L is the least common multiple for the periods Ts and Td. In the illustrated example, if conversion ratio Cv is 5/7, the equation (2) gives the Moire period Tm of the 20-pixel length. This Moire greatly deteriorates the picture quality.

The above problems can effectively be solved by an image processing technique according to the present invention to be given below. The description to follow is elaboration of an embodiment of this invention.

Figure 3:
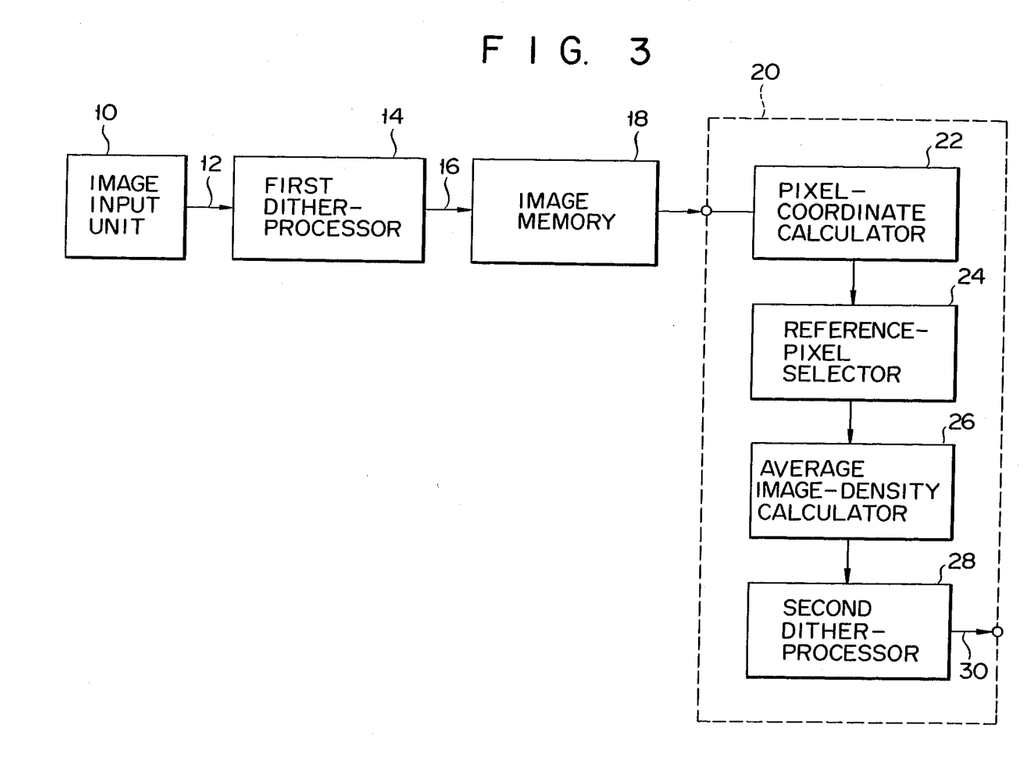
FIG. 3 is a block diagram schematically showing the overall arrangement of an image processing apparatus in accordance with one preferred embodiment of the present invention.

FIG. 3 shows a configuration of an overall image processing apparatus according to a preferred embodiment of the present invention. The image processing apparatus contains image input unit 10 for converting a continuous-tone initial image such as a photograph image into a digital image signal. An appropriate known method may be used for this conversion. Image input unit 10 samples an input image at a line density of 16 lines/mm, quantizes it, and produces 4-bit digital image signal 12 representative of a multilevel image. This multilevel image signal 12 is transferred to first dither processor 14.

First dither processor 14 converts multilevel image signal 12 into two-level image (binary image) signal 16 by the dither method. As shown in FIG. 1, the square dither matrix with the matrix pattern in which different threshold values are arrayed in a 4×4 fashion, as shown in FIG. 1, is used for converting the multilevel image into a binary image. Binary image signal 16 is temporarily stored in image memory 18.

When the binary image stored is subjected to the pixel-density conversion process, that image is read out from memory 18, and is transferred as an original image to pixel-density conversion processor 20. This processor executes the pixel-density conversion process of the original image, i.e., the binary continuous-tone image, at a desired conversion ratio Cv. The image thus obtained, i.e., the converted image, is expanded or reduced so that its pixels are arrayed at pitches as specified by the designated conversion ratio in the image plane.

Figure 4:
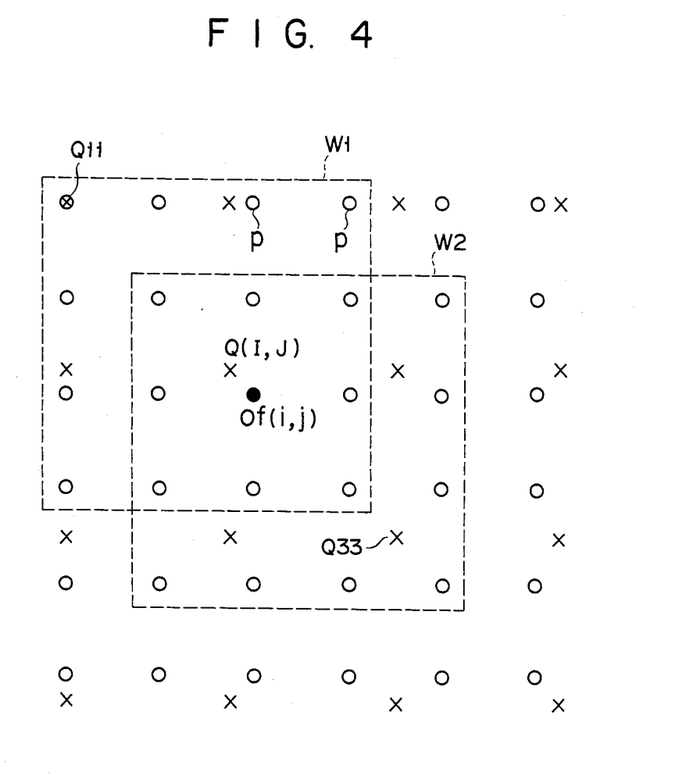
FIG. 4 is a diagram showing a model of the distribution of picture elements of a pixel-density converted image which is overlapped with those of an original binarized image.

FIG. 4 shows a model of a pixel array in a converted image, which is illustrated corresponding to that of the original image. In the figure, the pixel marked by "○" represents the pixels O(i, j) of the original image. The pixel marked by "X" represents that Q(I, J) of the converted image. "i", "j", "I", and "J" represent zero or positive integers. In this model, the original image is reduced in size at conversion ratio Cv=4/7.

In pixel-density conversion processor 20, pixel coordinate calculating unit 22 calculates a position of the pixel Q(I, J) in the converted image, which is located at the coordinates (x, y) in the original image plane. If normalized by the distance, i.e., pixel pitch, between the neighboring pixels in the original image plane, the coordinates (x, y) are given $$x = I/Cv \qquad (3)$$

$$y = J/Cv \qquad (4)$$

After completion of the calculation of the pixel coordinates of the converted image plane, calculator 22 compares the pixel coordinates of the original image with the pixel position of the converted image. From the original image pixels as generally represented by O(i, j) in the image area which overlaps with the area of the pixel array in the converted image, calculator 22 selects one pixel located closest to the corresponding pixel in the converted image. In the model of FIG. 4, the pixel Of(i, j) marked by "●" is selected, because this pixel Of(i, j) is positioned closest to the pixel in the converted image, which corresponds to the pixel Of(i, j) per se in the relative position in the image plane. This pixel Of(i, j) serves as a fiducial pixel to define the fiducial point in the above area of the original image. Such selection of the specific picture element is performed in the other partial areas in the pixel array of the converted image in a similar manner. In this way, a plurality of the fiducial pixels Of are selected for the entire area of the converted image. The coordinates positions of these fiducial pixels are expressed using the Gaussian symbol [ ], $$i = [(I/Cv) + 0.5] \qquad (5)$$

$$j = [(J/Cv) + 0.5] \qquad (6)$$

In this step, if another positional condition is used to select the fiducial pixels, the coordinate positions of the fiducial pixels may be expressed as follows:

$$i = [I/Cv] \qquad (5')$$

$$j = [J/Cv] \qquad (6')$$

In pixel-density conversion processor 20, reference pixel selecting unit 24 is provided so as to define a square window area W including the fiducial pixel Of in the image area. It should be noted that the size of this window W is equal to that of the dither matrix M, which is used in first dither-processor 14. Therefore, window W contains the same number of pixels as dither matrix M. That is to say, it contains 4×4 pixels. These pixels are extracted as reference picture elements or pixels (p). Since the reference pixel extracting area is set to the same size as that of the dither matrix M, all of the dot data can be extracted every dither matrix. As a result, the image-density information of the original image can exactly be picked up. The condition for determining the window W is only that the fiducial pixel must be contained therein, so that window W may be determined variously. In FIG. 4, only two windows W1 and W2 are illustrated by way of example.

Average pixel-density calculating unit 26 calculates an average image density of 16 reference pixels "p" contained in window W, the average density being used as the pixel density of the pixel of converted image. For example, when window W1 is used, reference pixels "p" are given by P (pixel set) = {O(i, j)} where $0 \leq i \leq 3$ and $0 \leq j \leq 3$. The result of the calculation is used as density data Dq(I, J) of the converted image Q(I, J). This density data Dq(I, J) is given by $$Dq(I, J) = \sum_{P} Do(i, j)/Nm \qquad (7)$$

where
Nm: total number of pixels in the dither matrix M
Do: Average image-density data of reference pixels "p" in the original image.

As a result, the density data Dq(I, J) of the converted data is expressed in the form of the multi-level signal of 4 bits. Density data Dq(I, J) is supplied to second dither processing unit 28.

Figure 5:
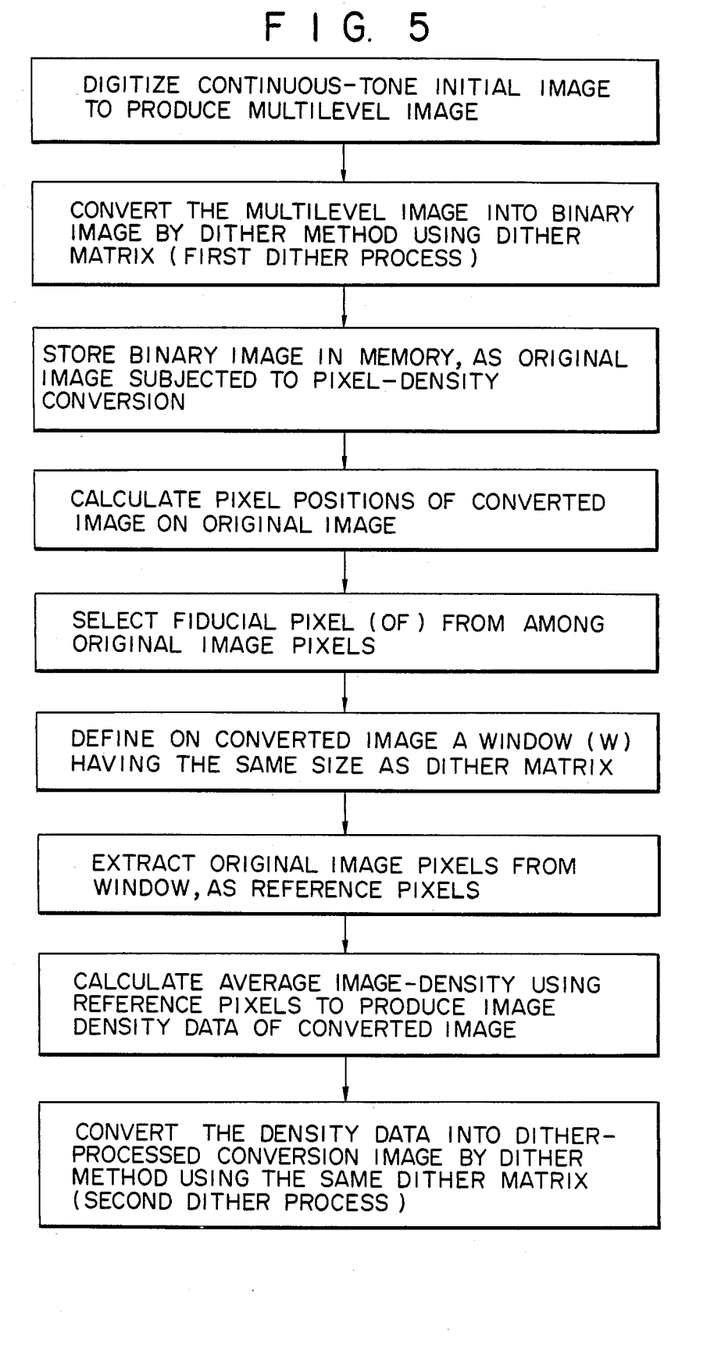
FIG. 5 is a flowchart showing the main processes of the pixel density-converting operation of t image processing apparatus of FIG. 3.

Second dither processor 28 binarizes the density data Dq(I, J) in the dither method, using the second matrix, so that it produces converted image signal 30 as dithered. In this embodiment, the size and the distribution pattern of threshold values of the second dither matrix are the same as those of the first one M. When density data Dq(I, J) has, in its peripheral area, a uniform gray corresponding to the threshold value "1" of the dither matrix M, only converted pixel Q11 shown by the mark "X" in FIG. 4 is in "black" level, while the remaining converted pixels shown by the mark "X" are in "white" level. When density data Dq(I, J) has a uniform gray at a density as increased so as to correspond in value to the threshold value "2" of dither matrix M, in the peripheral area thereof, converted pixels Q11 and Q33 are in "black" level (see the dither matrix pattern of FIG. 1), while the remaining ones marked as "X" are in "white" level. The process flow of the pixel-density conversion, which is executed in processor 20, is summarized in the flowchart of FIG. 5.

According to the image processing technique of the present invention, when the primary dithered binary image representing the continuous-tone image such as a photography image is subjected to the pixel-density conversion process, the pixels of the original image which are located around the fiducial pixel Of in each local image area of the converted image are picked up as the reference picture elements, or pixels "p". An average density of these pixels is calculated. The number of the original image pixels to be picked up in this process is equal to that of the threshold levels arrayed in the dither matrix M. The calculation result of the average image density is used as the local density data Dp of the converted image. The data Dp is subjected to the secondary dither processing, so that a binary converted image is generated. The binarizing processing is applied for the density data Dp exactly depicting the local density information of the original image. Therefore, fine continuous-tone in the original image can exactly be transferred to the two-level converted image. This fact indicates that the continuous tone of the converted image finally obtained is the best approximation of that of the original image. Further, the presence of the sampling frequency can be weakened in the pixel-density conversion process. This can minimize the interference of it with the dither pattern period Td, and hence minimize the generation of the Moire pattern. As a result, after being subjected to the pixel-density conversion, the resultant image is remarkably improved in picture quality and reality.

The reason why the local image-density information of the original image is exactly transferred to the converted image even if the selected position of the fiducial point Of is changed, will be given referring to FIG. 6.

Dither matrices generally expressed by M(m, n) (where m and n are zero or integers), are densely arrayed in the row and column directions, as shown. Each dither matrix M has the matrix pattern shown in FIG. 1. A repeating pattern of the dither matrices M(m, n) shown in FIG. 6 is applied for the image plane of FIG. 4 in which the pixel arrays of the original image and the converted image overlap.

Figure 6:
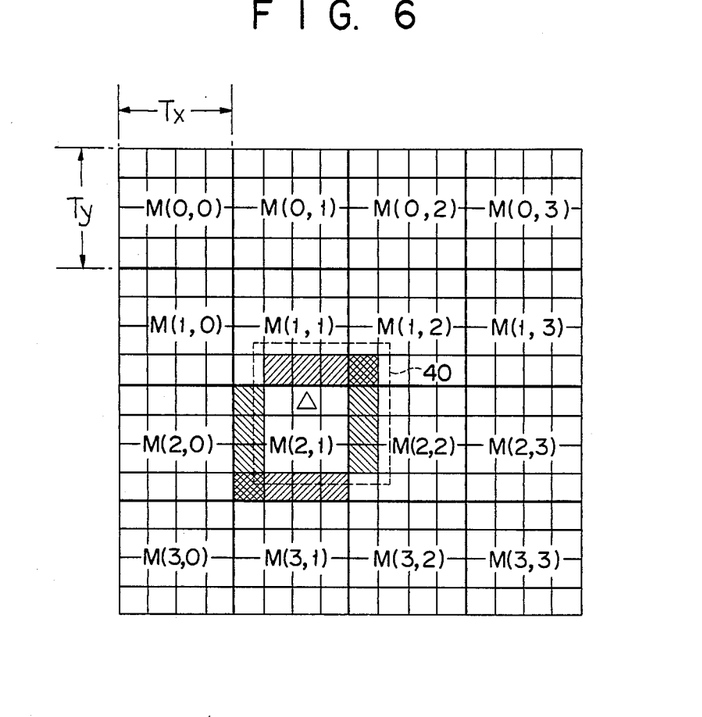
FIG. 6 is a diagram showing an image plane in which dither matrices are arranged in the row and column directions.

The threshold value Th(x, y) of each dither matrix M is given by $$Th(x, y) = Th(x + m \cdot Tx, y + n \cdot Ty) \quad (8)$$

where Tx and Ty are the periods of the dither pattern in the row and column directions in FIG. 6. Assuming that the density of the image is uniform over the entire image area, a pixel density f(x, y) is $$f(x, y) = f(x + m \cdot Tx, y + n \cdot Ty) \quad (9)$$

In FIG. 6, the fiducial picture element Of shown in FIG. 4 is illustrated with a delta mark "Δ". Square block 40 as shown by a broken line is for showing the window area W of FIG. 4. Square block 40, i.e., the window area W, has the same size as that of one dither matrix M, and is located partially overlapping with four dither matrices M(1, 1), M(1, 2), M(2, 1) and M(2, 2), as shown. In the case of calculating the average image density of reference pixels contained in such window 40, let us compare the average density of the window W itself with that of the dither matrix M(2, 1) maximally overlapping with the window 40. As seen from equation (9), the meshed portion in window 40 in FIG. 6 corresponds to the meshed portion located in the lower left part of the dither matrix M(2, 1). Similarly, the portions of slanted lines in window 40 correspond to those in dither matrix M(2, 1), respectively. Then, we have $$\sum_P f(x, y) = \sum_M f(x, y) \quad (10)$$

where
P: set of pixels in window 40
M: set of corresponding pixels in dither matrix M(2, 1).

The above formula indicates that the average density of window 40 is equal to that of dither matrix M(2, 1).

The above relation holds so long as the window area 40 is set to that of dither matrix M, even if the size and pattern of dither matrix M are changed. Further, since formula (10) is not dependent on the array (distribution) of the threshold values in the dither matrix, the equality of the average densities between window 40 and the dither matrix always holds irrespective of the distribution of the threshold values.

Although the invention has been described with reference to a specific embodiment, it shall be understood by those skilled in the art that numerous modification may be made that are within the spirit and scope of the inventive contribution.

For example, in the above-presented embodiment, the size and pattern of the dither matrix may appropriately be changed and modified. Further, the size and pattern of the first dither pattern are not necessarily the same as those of the second dither pattern.

What is claimed is:

1. An image processing apparatus comprising:
   (a) first processing means for receiving an electrical signal representing a continuous-tone input image and for converting said signal into a binary image signal defining a binary image of pixels each having respective pixel coordinates by a dither method using a first dither matrix having a matrix size and comprising a matrix multi-level threshold values; and
   (b) second processing means for receiving said binary image signal and for performing a pixel-density conversion thereon at a conversion ratio to produce an electrical signal representing a converted image defined by plural pixels having pixel coordinates defined by the conversion ratio, said second processing means comprising:
   first sub-processing means for calculating based on said conversion ratio coordinates in said binary image of at least one pixel of said converted image, and for selecting at least one certain pixel from among the pixels of said binary image as corresponding to said at least one pixel of the converted image based on the calculated coordinates, said at least one certain pixel defining at least one fiducial point with respect to said at least one pixel of the converted image,
   second sub-processing means for defining in said binary image at least one window area which contains said at least one certain pixel and corresponds to said matrix size of said first dither matrix, and for extracting as reference pixels for said at least one pixel of the converted image at least one set of pixels from said binary image from pixels which are contained in said at least one window area and located around said at least one certain pixel, and
   third sub-processing means for calculating at least one average density from said reference pixels for said at least one pixel of the converted image and for generating at least one image-density datum from said at least one average density, said at least one image-density datum corresponding to the image density said at least one pixel of the converted image in the converted image and being generated by binarizing said at least one average density by using a second dither matrix.

2. The image processing apparatus according to claim 1, wherein said at least one window area has a size substantially equal to said matrix size of said first dither matrix.

3. The image processing apparatus according to claim 2, wherein said first dither matrix is substantially the same as said second dither matrix.

4. The image processing apparatus according to claim 3, wherein said first sub-processing means comprises:
   means for comparing said calculated coordinates of said at least one pixel of said converted image in said binary image with said coordinates of said pixels of said binary image to determine at least one pixel one said binary image which is located closest to said calculated coordinates, wherein said at least one pixel of said binary image determined to be closest to said calculated coordinates is selected as said at least one certain pixel.

5. The image processing apparatus according to claim 1, wherein said first sub-processing means comprises:
   means for comparing said calculated coordiantes of said at least one pixel of said converted image in said binary image with said coordinates of said pixels of said binary image to determine at least one pixel of said binary image which is located closest to said calculated coordinates, wherein said at least one pixel of said binary image determined to be closest to said calculated coordinates is selected as said at least one certain pixel.

6. The image processing apparatus according to claim 5, further comprising:
   memory means connected to said first processing means for storing said binary image signal.

7. An image processing apparatus comprising:
   (a) first dither-processor means for receiving an electrical signal representing a continuous-tone input image and for converting said signal into a binary image signal defining a binary image of plural pixels each having a coordinates by a dither method using a first dither means having a matrix size and comprising a matrix pattern of multi-level threshold values;
   (b) pixel-density converter means for receiving said binary image signal and for performing a pixel-density conversion thereon at a conversion ratio of produce an electrical signal representing a converted image defined by plural pixels having pixel coordinates defined by the conversion ratio, said pixel-density converted means comprising:
   first calculator means for calculating based on said conversion ratio coordinates in said binary image of at least one pixel of said converted image, for comparing the calculated coordinates of said at least one pixel of said converted image in said binary image with said coordinates of said pixels of said binary image, and for selecting at least one certain pixel from among the pixels of said binary image which is located closest to said calculated coordinates, said at least one certain pixel defining at least one fiducial point with respect to said at least one pixel of said converted image,
   pixel-selector means for defining at least one window area in said binary image, said at least one window area containing said at least one certain pixel and corresponding to said matrix size of said first dither matrix, and for extracting as reference pixels for said at least one pixel of the converted image at least one set of pixels from said binary image from pixels which are contained in said at least window area and located around said at least one certain pixel,
   second calculator means for calculating at least one average density from said reference pixels for said at least one pixel of the converted image and for generating at least one image-density datum from said at least one average density, said at least one image-density datum corresponding to the image density of said at least one pixel of the converted image in the converted image, and
   second dither-processor means for binarizing said at least one image-density datum using a second dither matrix having a matrix size and a matrix pattern which are substantially the same as those of said first dither matrix.

8. The image processing apparatus according to claim 7, wherein said at least one window area has a size substantially equal to the matrix size of said first dither matrix.

9. An image processing method comprising the steps of:
   receiving an electrical signal representing a continuous-tone input image which is converted into a binary image signal defining a binary image of plural pixels each having coordinates by a dither method using a first dither matrix having a matrix size and comprising a matrix pattern of multi-level threshold values;
   performing a pixel-density conversion on said binary image signal at a conversion ratio to produce an electrical signal representing a converted image defined by plural pixels having pixel coordinates defined by the conversion ratio;
   calculating based on said conversion ratio coordinates in said binary image of at least one pixel of said converted image;
   selecting, based on the calculated coordinates in said binary image, from among said pixels of said binary image, at least one certain pixel defining at least one fiducial point with respect to the at least one pixel of the converted image and corresponding to said calculated coordinates;
   defining in said binary image at least one window area which contain said at least one certain pixel and corresponds to said matrix size of said first dither matrix;
   extracting as reference pixels for said at least one pixel of the converted image at least one set of pixels of said binary image from pixels which are contained in said at least one window area and located around said at least one certain pixel; and
   calculating at least one average density from said reference pixels for said at least one pixel of the converted image and generating at least one image-density datum from said at least one average density, said at least one image-density datum corresponding to the image density of said at least one pixel of the converted image in the converted image and being generated by binarizing said at least one average density by using a second dither matrix.

10. The image processing method according to claim 9, wherein said at least one window area has a size substantially equal to the matrix size of said first dither matrix.

11. The image processing method according to claim 10, wherein said first dither matrix is substantially the same as said second dither matrix.

12. The image processing method according to claim 9, wherein said selecting step comprises:
   comparing said calculated coordinates of said at least one pixel of said converted image in said binary image with said coordinates of said pixels of said binary image to determine at least one pixel of said binary image which is located closest to said calculated coordinates and selecting said at least one pixel of said binary image determined to be closest to said calculated coordinates as said at least one certain pixel.

13. An image processing method comprising the steps of:
   receiving an electrical signal representing a continuous-tone input image and converting said signal into a binary image signal defining a binary image of plural pixels having respective coordinates by a dither method using a first dither matrix having a matrix size and comprising a matrix pattern of multi-level threshold values;
   performing a pixel-density conversion on said binary image signal at a conversion ratio to produce an electrical signal representing a converted image defined by a plural pixels having pixel coordinates defined by the conversion ratio;

calculating based on said conversion ratio coordinates in said binary image of at least one pixel of said converted image;

comparing the calculated coordinates of said at least one pixel of said converted image in said binary image with said coordinates of said pixels of said binary image and based on said comparing selecting from among the pixels of said binary image at least one certain pixel defining at least one fiducial point with respect to said at least one pixel of said converted image;

defining in said binary image at least one window area which contains said at least one certain pixel and corresponds to said matrix size of said first dither matrix;

extracting as reference pixels for said at least one pixel of the converted image at least one set of pixels from said binary image from pixels which are contained in said at least one window area and located around said at least one certain pixel;

calculating at least one average density from said reference pixels for said at least one pixel of the converted image and generating at least one image-density datum from said at least one average density, said at least one image-density datum corresponding to the image density of said at least one pixel of the converted image in the converted image; and binarizing said at least one image-density data using a second dither matrix having a matrix size and a matrix pattern which are substantially the same as those of said first dither matrix.

14. The image processing method according to claim 13, wherein said at least one window area has a size substantially equal to the matrix size of said first dither matrix.

* * * * *